US009500113B2

(12) United States Patent
Bucci

(10) Patent No.: US 9,500,113 B2
(45) Date of Patent: Nov. 22, 2016

(54) AFTERMARKET EXHAUST DETECTION

(71) Applicant: HONDA MOTOR CO., LTD, Tokyo (JP)

(72) Inventor: Andrew M. Bucci, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 14/228,722

(22) Filed: Mar. 28, 2014

(65) Prior Publication Data

US 2015/0275736 A1 Oct. 1, 2015

(51) Int. Cl.
*F01N 3/00* (2006.01)
*F01N 11/00* (2006.01)
*F01N 9/00* (2006.01)
*F01N 13/08* (2010.01)
*F01N 3/20* (2006.01)

(52) U.S. Cl.
CPC ............... *F01N 11/00* (2013.01); *F01N 9/00* (2013.01); *F01N 13/087* (2013.01); *F01N 3/2053* (2013.01); *F01N 2410/00* (2013.01); *F01N 2900/06* (2013.01); *Y02T 10/47* (2013.01)

(58) Field of Classification Search
CPC ........ F01N 11/00; F01N 9/00; F01N 3/2053; F01N 13/087; F01N 2900/06; F01N 2410/00; Y02T 10/47
USPC .................................................... 60/277, 285
See application file for complete search history.

(56) References Cited

U.S. PATENT DOCUMENTS

| | | | |
|---|---|---|---|
| 5,655,367 A | 8/1997 | Peube et al. | |
| 5,723,829 A | 3/1998 | Inomata et al. | |
| 5,744,762 A | 4/1998 | Seki et al. | |
| 6,182,445 B1 * | 2/2001 | Yamazaki | F01N 3/0814 137/551 |
| 6,182,455 B1 | 2/2001 | Yamazaki et al. | |
| 6,810,850 B2 | 11/2004 | Anderson et al. | |
| 6,968,677 B2 * | 11/2005 | Tamura | F01N 3/20 60/277 |
| 7,401,592 B2 | 7/2008 | Willats et al. | |
| 7,428,947 B2 | 9/2008 | Nohl et al. | |
| 7,536,990 B2 | 5/2009 | Willats et al. | |
| 8,327,635 B2 | 12/2012 | Hahnl | |
| 8,341,937 B2 * | 1/2013 | I | F01N 3/101 60/277 |

(Continued)

FOREIGN PATENT DOCUMENTS

| | | |
|---|---|---|
| DE | 102004040818 | 3/2006 |
| DE | 102011100238 | 11/2012 |
| EP | 1036919 | 9/2000 |

*Primary Examiner* — Thomas Denion
*Assistant Examiner* — Diem Tran
(74) *Attorney, Agent, or Firm* — Arent Fox LLP

(57) ABSTRACT

A vehicle includes an exhaust system, and a plurality of active exhaust valves configured to modulate an exhaust flow through the exhaust system. A controller is configured to detect an ignition state of the vehicle, determine whether any of the plurality of active exhaust valves has malfunctioned, and, upon determining that all of the plurality of active exhaust valves were operating normally when the ignition state transitioned from a first on state to a first off state and that all of the plurality of active exhaust valves have malfunctioned when the ignition state transitions from the first off state to a second on state, enable normal operation of an engine of the vehicle.

21 Claims, 4 Drawing Sheets

(56) References Cited

U.S. PATENT DOCUMENTS

| | | | |
|---|---|---|---|
| 2003/0225507 A1* | 12/2003 | Tamura | F01N 3/20 701/114 |
| 2005/0010354 A1* | 1/2005 | Fuwa | F01L 13/0015 701/104 |
| 2005/0109024 A1 | 5/2005 | Nohl et al. | |
| 2006/0102148 A1* | 5/2006 | Nakazawa | F02D 41/005 123/436 |
| 2006/0272322 A1 | 12/2006 | Abram et al. | |
| 2008/0034743 A1 | 2/2008 | Abram et al. | |
| 2011/0101259 A1 | 5/2011 | Pisera et al. | |

\* cited by examiner

AFTERMARKET EXHAUST DETECTION

FIELD OF THE INVENTION

The present invention relates to systems and methods for controlling the operation of active exhaust valves (AEVs) of a vehicle and, more particularly, detecting the installation of an aftermarket exhaust system into a vehicle and subsequent AEV control.

BACKGROUND OF THE INVENTION

The exhaust systems of some vehicles include active exhaust valves (AEVs) configured to modulate the flow of gasses through the exhaust system. The AEVs can be used to control engine performance as well as the acoustic attributes of the vehicle's exhaust. Generally, the positions of each of the AEVs are set based upon control signals transmitted by the vehicle's engine ECU or some other suitably configured controller within the vehicle.

During operation, many AEVs generate diagnostic signals that are transmitted to the ECU to indicate whether the AEVs are operating correctly. The diagnostic signals may indicate an overall health of the AEVs as well as provide information regarding the current position and operating conditions of the AEVs. In some situations, the diagnostic signals may indicate that an AEV has failed. Alternatively, the fact that a particular AEV has failed to transmit a diagnostic message may be used as an indication that the valve has failed. For AEVs that are not configured to transmit diagnostic messages, a failure can be detected by other mechanisms, such as via a feedback position sensor or the AEVs control electronics. Upon detecting that one or more of the AEVs has failed or is otherwise malfunctioning or non-communicative, the ECU can then take appropriate corrective action.

At high engine speeds, it is important that the engine's exhaust system provide high exhaust flow allowing for efficient dispersal of exhaust heat. Accordingly, as engine speed varies, the positioning of the AEVs is adjusted to provide for effective exhaust flow and corresponding cooling. In the event of a failure or malfunction of one or more AEVs, the correct position of the AEVs cannot be determined. Because there is some risk that the AEVs failed in a substantially closed position, which could result in a dangerous build-up of heat within the exhaust systems and engine, the engine speed must be limited to prevent overheating and damage.

Sometimes aftermarket exhausts are installed into vehicles. To save weight, the aftermarket exhaust may not utilize exhaust valves and instead have a substantially high-flow design. Although such an aftermarket exhaust may be an entirely safe addition to the vehicle—their open flow design ensuring sufficient exhaust gas flow—in the case of an aftermarket exhaust that does not use or connect to the vehicle's AEVs, the engine's ECU will not receive any diagnostic signals from the AEVs. This may cause the ECU to believe that the AEVs have failed and reduce engine performance to compensate. This, however, is not necessary as the aftermarket exhaust provides sufficient exhaust flow for safe operation of the vehicle without the need for AEVs. As such, the ECU needlessly reduces engine performance.

SUMMARY OF THE INVENTION

In one embodiment, a vehicle includes an exhaust system, a plurality of active exhaust valves configured to modulate an exhaust flow through the exhaust system, and a controller. The controller is configured to detect an ignition state of the vehicle, determine whether any of the plurality of active exhaust valves has malfunctioned, and upon determining that all of the plurality of active exhaust valves were operating normally when the ignition state transitioned from a first on state to a first off state and that all of the plurality of active exhaust valves have malfunctioned when the ignition state transitions from the first off state to a second on state, enable normal operation of an engine of the vehicle.

In another embodiment, a controller includes a processor configured to detect an ignition state of a vehicle, detect a malfunction in each of a plurality of active exhaust valves in the vehicle, and upon detecting a malfunction of one of the plurality of active exhaust valves, reduce a power output of an engine of the vehicle, except when malfunctions are detected in all of the plurality of active exhaust immediately following an ignition off state where, prior to the ignition off state, all of the plurality of active exhaust valves were determined to be operating normally.

In another embodiment, a method includes, upon determining that a plurality of active exhaust valves in a vehicle were operating normally when an ignition state of the vehicle transitioned from a first on state to a first off state and that all of the plurality of active exhaust valves have malfunctioned when the ignition state transitions from the first off state to a second on state, at least one of enabling normal operation of an engine of the vehicle, optimizing an operation of the engine of the vehicle for an aftermarket exhaust, and generating an informational message.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
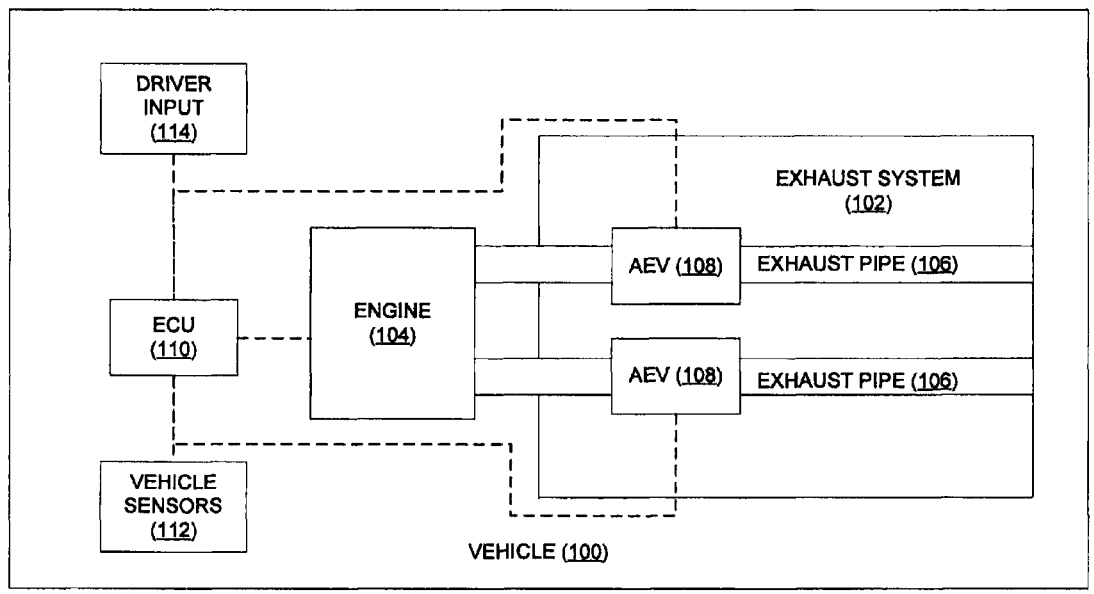
FIG. 1 is a block diagram illustrating functional components of a vehicle that can be used to control active exhaust valves of an exhaust system in accordance with the present disclosure.

The present invention relates to systems and methods for controlling the operation of active exhaust valves of a vehicle and, more particularly, detecting the installation of an aftermarket exhaust system into a vehicle and subsequent active exhaust valve control.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed in any such flow chart diagrams are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some vehicles use AEVs to modulate exhaust flow through the vehicle's exhaust system. When an aftermarket exhaust is installed into such a vehicle, the aftermarket exhaust will often not incorporate or utilize AEVs. This is done to save weight and improve overall performance.

Although such an aftermarket exhaust may be a safe addition to the vehicle (their open flow design ensuring sufficient exhaust gas flow), in the case of an aftermarket exhaust that does not use or connect to the vehicle's AEVs, the engine's ECU will not receive any diagnostic signals from the AEVs. This may cause the ECU to believe that the AEVs have failed and reduce engine performance to compensate. This, however, is not necessary as the aftermarket exhaust provides sufficient exhaust flow for safe operation of the vehicle without the need for AEVs.

In the present system, therefore, a modified ECU controller logic is utilized to allow for both the installation of an aftermarket exhaust into a vehicle while, after the install, the vehicle can be operated using maximum engine performance. The controller logic is specifically configured to detect a sequence of events indicating that an aftermarket exhaust has been installed into the vehicle. Upon detecting that sequence of events, the ECU will, even after failing to receive diagnostic signals from the vehicle's AEVs or otherwise detecting a failure condition, allow normal (i.e., maximum power) operation of the vehicle's engine.

FIG. 1 is a block diagram illustrating functional components of a vehicle that can be used to control active the AEVs of an exhaust system in accordance with the present disclosure. Vehicle 100 includes exhaust system 102. Exhaust system 102 may include a number of components configured to facilitate the transfer of exhaust gasses away from the vehicle's engine 104. Exhaust system 102 may include, for example, a number of exhaust pipes 106 (in this example two exhaust pipes are illustrated, though the exhaust system 102 may utilize any number of exhaust pipes). Exhaust pipes 106 may include or be coupled to other components such as catalytic converters, mufflers, and the like, not shown. An AEV 108 is coupled to each exhaust pipe 106. AEVs 108 are configured to modulate a gas flow though each of exhaust pipes 106. The position of each of AEVs 108 (and, thereby, the amount of gas flow through the AEVs 108) can be controlled by electronic control unit (ECU) 110.

ECU 110 is a control unit and may include one or more computer processors configured to execute instructions, received data, and transmit instructions. In some cases ECU 110 is configured as a single processing unit housed within a single housing. In other implementations, though, ECU 110 may be implemented by a number of separate computer processors that are in communication with one another and disposed within one or more housings about the vehicle. In one specific embodiment, ECU 110 is a fuel injector electronic control unit (FI-ECU).

ECU 110 is configured to receive data from a number of different vehicle 100 systems. The data may include sensor data, user input data, vehicle history data, and the like. The data may be received by ECU 110 using any suitable medium of communication, such as a wired or wireless data connection. ECU 110 then executes one or more algorithm to analyze all or a portion of the received data. Based upon the results of that analysis, ECU 110 calculates an optimum position for one or more of AEVs 108 of exhaust system 102.

Depending upon the algorithms implemented by ECU 110, the calculated optimum positions for the one or more of AEVs 108 of exhaust system 102 may result in all AEVs 108 of exhaust system 102 being set to the same position. In some circumstances, however, the optimum position of each of AEVs 108 may be different from one another. This may occur, for example, in a vehicle 100 having four exhaust pipes and four corresponding AEVs 108. If, for example, the vehicle's engine 104 is operating with a relatively low power output (and correspondingly low exhaust gas output), two of the four AEVs 108 may be closed completely, forcing all gas flow to pass through the other two AEVs 108, in an effort to reduce noise output. As the engine output increases, however, the two closed AEVs 108 may be gradually opened to ensure sufficient gas flow through the exhaust system 102.

In the embodiment of ECU 110 illustrated in FIG. 1, ECU 110 is coupled to a plurality of vehicle sensors 112. Vehicle sensors 112 are configured to detect an operating condition of one or more of the systems or components of vehicle 100 and communicate an indication of those operating conditions to ECU 110. In one embodiment, vehicle sensors 112 include an engine sensor configured to measure a performance output of engine 104 of vehicle 100. The performance output data can be used by ECU 110 to determine an optimum positioning for each of the vehicle's AEVs 108. In various embodiments, vehicle sensors 112 may include sensors to detect an exhaust gas flow rate of engine 104, an operating temperature of one or more of exhaust pipes 106 of exhaust system 102, a type of fuel being supplied to engine 104, and the like.

ECU 110 is also configured to receive an input from driver input 114. In one embodiment, driver input 114 enables a driver to select one of a number of driving modes for vehicle 100. For example, the driving modes may include a normal driving mode, sport driving mode, track driving mode, and launch driving mode. Each driving mode, once selected, will cause vehicle 100 (and in many cases engine 104 of vehicle 100) to respond differently to a driver input. For example, as the driving progress through increasingly aggressive modes (e.g., from normal, to sport, to track modes), the vehicle may exhibit attributes that are increasingly aggressive. Such attributes may include a more aggressive throttle response, stiffer suspension, more aggressive braking, heightened depiction of vehicle attributes like RPM and brake temperature that can assist with racing over normal driving, more aggressive transmission timing, and the like. Furthermore, in the different driving modes, ECU 110 may execute different control algorithms for the AEVs 108 of vehicle 100. For example, when driving vehicle 100 in a normal driving mode, ECU 110 may maintain the AEVs 108 a relatively closed position in order to reduce exhaust noise—the normal mode will often be used when driving on conventional roads amongst traffic. In sportier modes, however, ECU 110 may default to maintaining the AEVs 108 in a more open position to ensure sufficient exhaust flow. This will additionally result in a louder exhaust note.

ECU 110 is also configured to receive data from each of AEVs 108. The data may include diagnostic messages indicating to ECU 110 a current operational state of the AEV 108 (e.g., operating normally or experiencing a malfunction), or data indicating a current operation condition (e.g., valve position) of the AEV 108. ECU 110 can use the data received from AEVs 108 to determine whether each of the AEVs 108 is operating correctly and the current position of each of AEVs 108.

In one embodiment, AEVs 108 are configured to transmit diagnostic messages to ECU 110 according to a predetermined schedule (e.g., a diagnostic message is transmitted every second or a number of milliseconds). Then, if the ECU 110 fails to receive a scheduled diagnostic message from a particular AEV 108, ECU 110 can determine that the AEV 108 has failed—the inability to transmit a diagnostic message can be taken as an indication of failure. In some cases, the ECU 110 will require the failure to receive a number of scheduled diagnostic message (e.g., 10 sequential messages), before a failure is diagnosed. In other cases, the AEV 108 may transmit a diagnostic message that indicates the AEV 108 is failing, or perhaps that the AEV 108 has already failed. If one of the AEVs 108 fails while the vehicle 100 is running, ECU 110 may then be required to take appropriate action. For example, because there is some risk that the AEV 108 may have failed in a substantially closed position, ECU 110 may reduce the maximum allowable power output of engine 104 to avoid dangerous heat build-up within exhaust system 102.

ECU 110 is also configured to perform certain actions (and cause other vehicle systems to perform certain functions) when vehicle 100 is either being turned off or turned on. For example, when vehicle 100 is turned off (i.e., transitioning into an ignition off state from an ignition on state), ECU 110 may be configured to set each one of AEVs 108 into a fully open position.

As discussed above, because the installation of an aftermarket exhaust into a vehicle often results in the disconnection of the vehicle's AEVs, there is some risk that the vehicle's ECU, having failed to receive any diagnostic messages from the disconnected AEVs may determine that the valves have malfunctioned and unnecessarily reduce engine output as a consequence. The present disclosure, therefore, provides an ECU logic enabling the ECU to detect a sequence of events that are likely to indicate that an aftermarket exhaust has been installed into the vehicle and that vehicle's AEVs have been disconnected and have not failed. This allows the vehicle's engine to operate as normal, making full use of the aftermarket exhaust.

Figure 2:
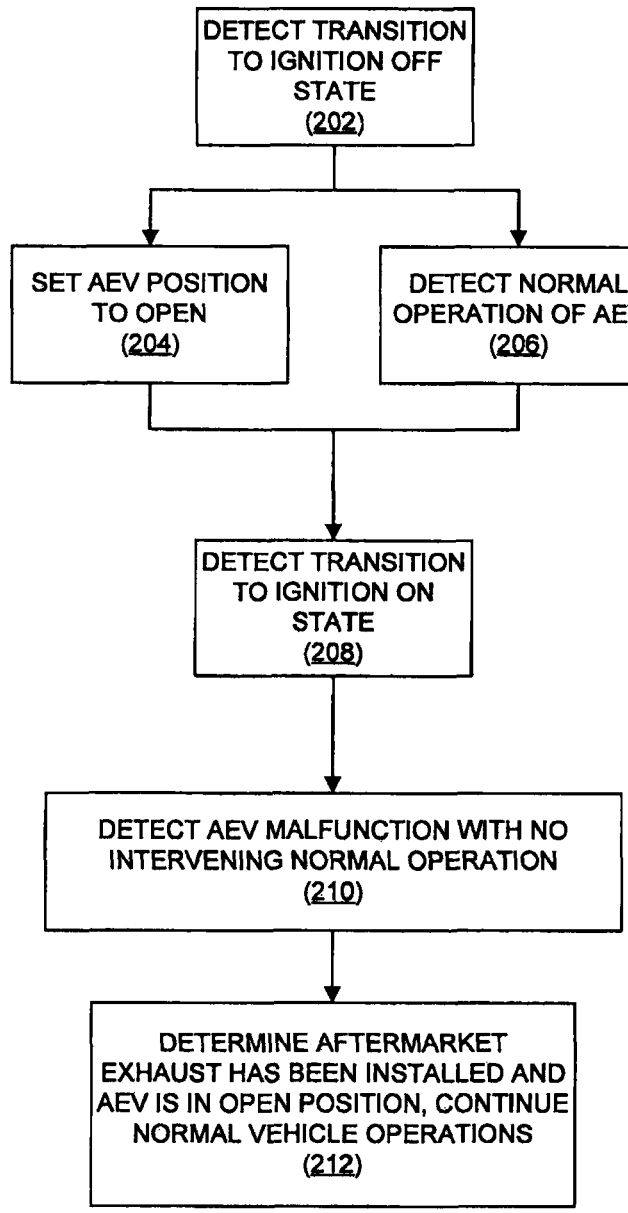
FIG. 2 is a flow chart illustrating the present ECU logic for controlling a vehicle system in accordance with the present disclosure.
Figure 3:
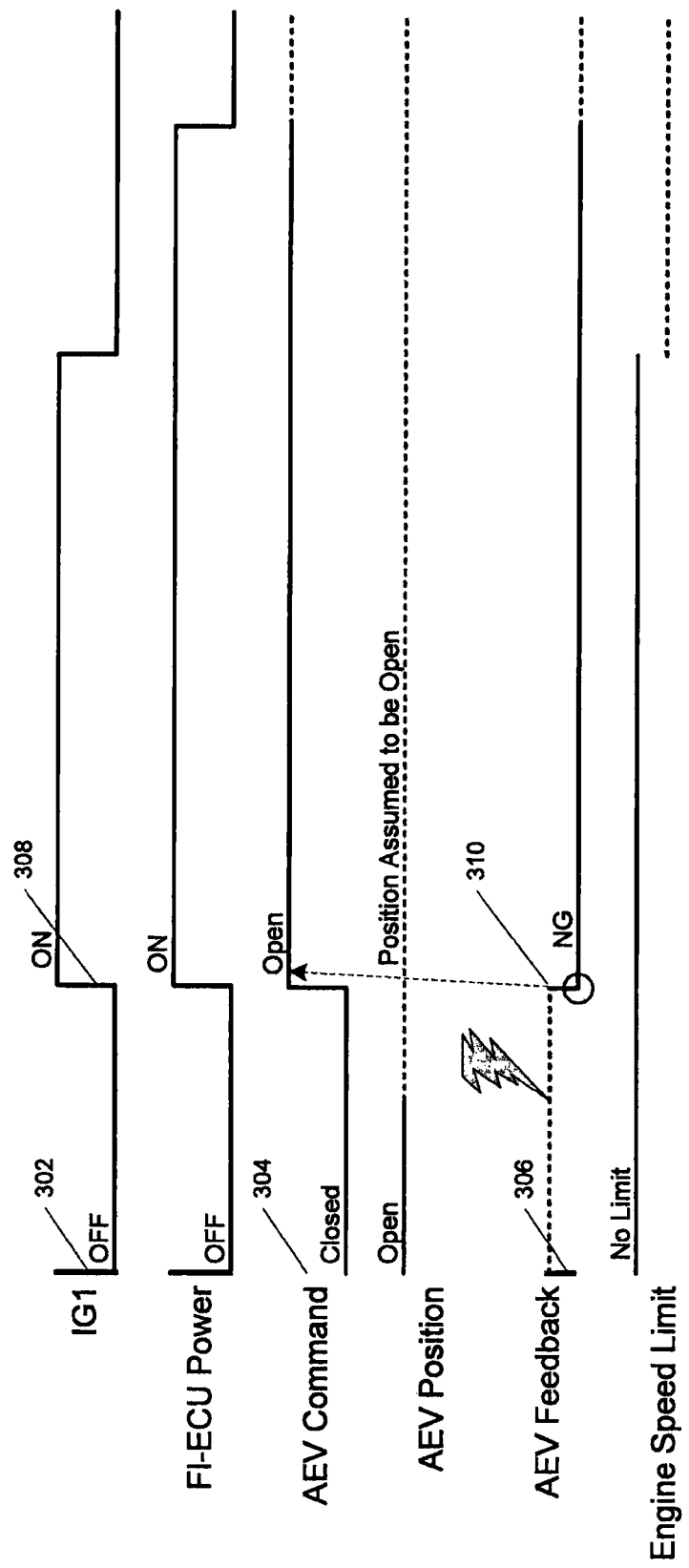
FIG. 3 is a timing diagram showing the states of a number of vehicle systems and control inputs that may occur during the execution of the logic of FIG. 2.

FIG. 2 is a flow chart illustrating the present ECU logic for controlling a vehicle system in accordance with the present disclosure. FIG. 3 is a timing diagram showing the states of a number of vehicle systems and control inputs that may occur during the execution of the logic of FIG. 2.

Referring to FIG. 2, in step 202 the ECU 110 determines that vehicle 100 is transitioning from an ignition on state to an ignition off state. This illustrated in FIG. 3 by the ignition state (IG1) transitioning into the OFF position (see element 302).

Returning to FIG. 2, after determining that the vehicle is transitioning into an ignition off state, ECU 110 sets the vehicle's AEVs to an open position (step 204 of FIG. 2 and element 304 of FIG. 3). ECU 110 then determines that the AEVs are operating normally (step 206), for example, by receiving a diagnostic message from each AEV indicating normal operation (see element 306 of FIG. 3). The determination ensures that the vehicle's AEVs are all now positioned in an open position in accordance with step 204.

Sometime later, in step 208, ECU 110 detects that vehicle 100 is transitioning into an ignition on state (see element 308 of FIG. 3). At that time, in step 210 the ECU 110 detects that all AEVs have failed. The failure may be determined in a number of ways. For example, the ECU 110 may, after ignition on, fail to receive any diagnostic messages from any of the AEVs (see element 310 of FIG. 3). The failure to receive the diagnostic messages may occur, for example, because all of the AEVs have been disconnected, the vehicle's exhaust sub harness has been disconnected or grounded, or a fuse has been removed from the AEV system. Alternatively, ECU 110 may receive diagnostic messages from each AEV indicating that all AEVs in the vehicle have failed.

Because it is very unlikely that all AEVs fail while the vehicle is in an ignition off state, and because ECU 110 has determined that all AEVs were working normally at the time the ignition was turned off, ECU 110 can make the determination that the AEVs have not, in fact failed, and instead have been disconnected as part of an aftermarket install. Additionally, because the last command given to the AEVs instructed all of the AEVs to move into an open position (step 204) and the command was successfully processed, ECU 110 can also determine that, even though the AEVs are not in communication with ECU 110 (or have otherwise been determined to have failed), the AEVs are still in their respective open and safe positions. As such, in step 212, ECU 110 can determine that an aftermarket exhaust has been installed into the vehicle, that the AEVs are each in their respective open positions, and that the vehicle's engine can operate as normal, without any reduction in power output. As such, ECU 110, given the sequence of events illustrated by the flowchart of FIG. 2 can ignore the fact that ECU 110 has failed to receive diagnostic messages from the AEVs (or may have even received an indication that the AEVs have failed) and continue to allow the vehicle and, specifically, the vehicle's engine to operate normally. This allows for the installation of an aftermarket exhaust into the vehicle that may require the disconnection of the vehicle's AEVs (or removal from the vehicle entirely), without an unnecessary reduction in the vehicle's engine output.

Figure 4:
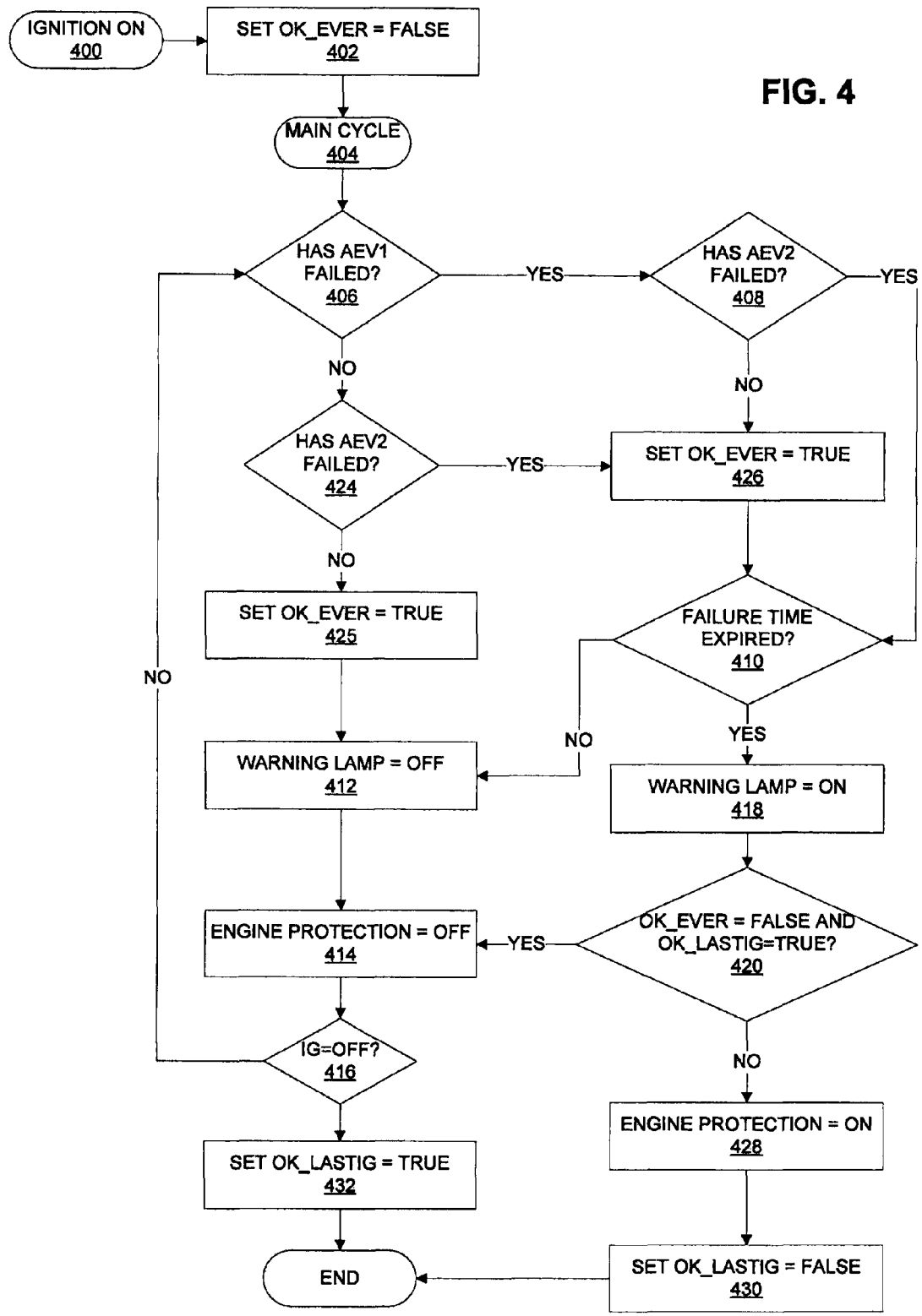
FIG. 4 is a flowchart illustrating an ECU logic for managing engine protection in a vehicle having two AEVs.

The present ECU logic can be extended to cover a vehicle implementation having multiple AEVs. For example, FIG. 4 is a flowchart illustrating an ECU logic for managing engine protection in a vehicle having two AEVs.

In step 400, the vehicle's ignition is turned on. Following ignition, in step 402 an OK_EVER flag within the vehicle's ECU is set to False. The OK_EVER flag indicates whether, during the current ignition cycle, any of the vehicle's AEVs have been identified as operating normally. Having set the OK_EVER flag, the ECU enters a main cycle in step 404.

In step 406, the ECU determines whether the first AEV (AEV1) has experienced a failure. The determination may be made, as described above, based upon the failure to receive a diagnostic message from the AEV, receipt of a diagnostic message that indicates a failure either within AEV1 of the AEV system in general, or any other method for detecting a failure or improper operation of AEV1. If a failure is detected in AEV1, the ECU goes on to perform the same check for the second AEV (AEV2) in step 408. If a failure is detected in AEV2 in step 408, that indicates that both valves are determined to have failed. The ECU then moves to step 410 to determine whether a failure time has expired.

In various embodiments, step 410 is an optional step that requires the ECU to wait a certain period of time before declaring a failure in one or more of the AEVs. Because, immediately following vehicle ignition, vehicle systems can generate anomalous outputs, by inserting a mandatory delay the ECU can be sure than any detected failures of AEV1 and AEV2 are not anomalous, temporary signals and are, in fact, true failures.

If the failure time has not expired, the ECU sets the engine warning lamp into an off state in step 412, and sets the engine protection to off in step 414. Then, in step 416 the ECU determines whether the ignition is of and diagnostics are complete. If the vehicle has just been turned on, the ignition will not be off, instead the ignition will be on. As such, the ECU returns to step 404, repeating the main cycle. If both AEVs have truly failed, the ECU will keep flowing through steps 406, 408, 410, 412, and 414 of the main cycle until the failure time has expired.

After the failure time has expired, the ECU moves from step 410 to step 418 and turns on the vehicle's warning light. Then, in step 420, the ECU makes a determination as to whether the OK_EVER flag is false and whether the OK_LASTIG is true. If the OK_LASTIG flag is set to true, that indicates that, at the preceding ignition off event, both AEVs were determined to be operating normally. Conversely, if the OK_LASTIG flag is false, that indicates that, at the preceding ignition off event, at least one of the AEVs had experienced a failure.

If the OK_LASTIG flag is true and the OK_EVER flag is false, that indicates that at the time of the last ignition off event, all of the vehicle's AEVs were working normally and that immediately upon the ignition being turned on, all vehicle AEVs have failed. As discussed above, this sequence of events can be interpreted to mean that an aftermarket exhaust has been installed that does not utilize the AEVs and that the AEVs are in their fully open positions. Even if no aftermarket exhaust has in fact been installed, however, that sequence of events can indicate that all AEVs are in their fully open positions and that normal vehicle operations are possible.

As such, in step 414, if both of those conditions are true, the ECU disables engine protection. In other implementations, however, upon determining that both conditions are true, the ECU can take any desired action. For example, the ECU may in fact reduce engine performance, but prompt the vehicle's driver with an option to override the engine performance reduction thereby enabling normal engine operations. The ECU may generate an informational message indicating that the ECU believes an aftermarket exhaust has been installed. The informational message may be displayed via a suitable user interface within the vehicle and may enable the operator to confirm that an aftermarket exhaust has been installed. Alternatively, the information message may be generated as a code outputted via an on-board diagnostic port of the vehicle or any other suitable communication device or port. In some cases, the ECU, having determined that an aftermarket exhaust has been installed into the vehicle, may use that knowledge to control or adjust one or more of the vehicle's engine performance parameters so as to be optimized for that particular exhaust setup.

Then, in step 416, the ECU determines whether the vehicle's ignition is off. If not, the method returns to step 406 and continues executing the main cycle.

Returning to step 406, if the ECU determines that AEV1 has not failed, the ECU moves to step 424 to determine whether AEV2 has failed. If AEV2 has also not failed, the ECU determines that both AEVs are working normally and in step 425 sets the OK_EVER flag to a value of true, indicating that at least one of the AEVs has operated normally this ignition cycle. The ECU then turns the warning lamp off in step 412, turns off engine protection in step 414, and moves to step 416.

If, however, the ECU determines that AEV1 has failed, while AEV2 has not failed (e.g., via steps 406, 408) or that AEV1 has failed, while AEV2 has not failed (e.g., via steps 406, 424), the ECU sets the OK_EVER flag to true in step 426 indicating that during the present ignition cycle, at least one AEV has been determined to operate normally. This indicates that the detected failure of one of the AEVs is not due to the installation of an aftermarket exhaust, which would result in both AEVs having failed. Having set the OK_EVER flag to true, the condition in step 420 is not satisfied and the ECU sets the engine protection to on in step 428. Having detected a failure requiring that engine protection be implemented, the ECU, in step 430 sets the OK_LASTIG flag to false and ends.

When the vehicle is switched off, the IG=off condition of step 416 is satisfied. The ECU then, in step 432 performs a diagnostic test to determine whether both AEVs are operating normally. If so, OK_LASTIG is set to true. If not, OK_LASTIG is set to false. The method then ends.

The method illustrated in FIG. 4, therefore, can be used by an ECU to determine whether to implement engine protection upon failure of one or more of a vehicle's AEVs. Although the method may be used to make the determination that an aftermarket exhaust has been installed, the method may be utilized as a general method of controlling engine protection, without consideration of whether a particular exhaust has been installed into a vehicle. For example, even if no new exhaust has been installed into the vehicle, the method of FIG. 4 can be used to control AEV operations should the detected malfunctions be due to some other cause. Accordingly, if the AEVs of a vehicle were working normally at ignition off, but then at the next ignition on state all AEVs had failed—for any reason—the present method may be utilized to control engine protection in such a vehicle. The failure may be due to installation of an aftermarket exhaust, or any other cause, such as control wires becoming cut, all AEVs seizing in their respective open positions, the AEVs themselves being removed or disable, and the like.

The present invention has been described in terms of one or more preferred embodiments, and it should be appreciated that many equivalents, alternatives, variations, and modifications, aside from those expressly stated, are possible and within the scope of the invention.

The invention claimed is:

1. A vehicle, comprising:
an exhaust system;
a plurality of active exhaust valves configured to modulate an exhaust flow through the exhaust system;
a controller configured to:
detect an ignition state of the vehicle,
determine whether any of the plurality of active exhaust valves has malfunctioned, and
upon determining that all of the plurality of active exhaust valves were operating normally when the ignition state transitioned from a first on state to a first off state and that all of the plurality of active exhaust valves have malfunctioned when the ignition state transitions from the first off state to a second on state, enable normal operation of an engine of the vehicle.

2. The vehicle of claim 1, wherein the controller is configured to:
upon determining that all of the plurality of active exhaust valves were not operating normally when the ignition state transitioned from the first on state to the first off state and that all of the plurality of active exhaust valves have malfunctioned when the ignition state transitions from the first off state to the second on state, reduce a power output of an engine of the vehicle.

3. The vehicle of claim 1, wherein determining that the plurality of active exhaust valves were operating normally includes receiving diagnostic messages from each of the plurality of active exhaust valves indicating that the plurality of active exhaust valves are operating normally.

4. The vehicle of claim 1, wherein determining that one of the plurality of active exhaust valves has malfunctioned includes failing to receive diagnostic messages from the active exhaust valve.

5. The vehicle of claim 1, wherein determining that one of the plurality of active exhaust valves has malfunctioned includes receiving a diagnostic message indicating a failure of the active exhaust valve.

6. The vehicle of claim 1, wherein the controller is configured to, when the ignition state transitions from on to off, set each of the plurality of active exhaust valves to fully open positions.

7. The vehicle of claim 1, wherein the controller is configured to delay the determination that all of the plurality of active exhaust valves have malfunctioned by a failure time.

8. The vehicle of claim 1, wherein determining that all of the plurality of active exhaust valves have malfunctioned when the ignition state transitions from the first off state to the second on state includes determining that none of the plurality of active exhaust valves has operated normally since the ignition state transitioned into the second on state.

9. A controller, comprising:
a processor configured to:
detect an ignition state of a vehicle,
detect a malfunction in each of a plurality of active exhaust valves in the vehicle, and
upon detecting a malfunction of one of the plurality of active exhaust valves, reduce a power output of an engine of the vehicle, except when malfunctions are detected in all of the plurality of active exhaust immediately following an ignition off state where, prior to the ignition off state, all of the plurality of active exhaust valves were determined to be operating normally.

10. The controller of claim 9, wherein determining that all of the plurality of active exhaust valves were operating normally includes receiving diagnostic messages from each of the plurality of active exhaust valves indicating that each of the plurality of active exhaust valves are operating normally.

11. The controller of claim 9, wherein detecting the malfunction of one of the plurality of active exhaust valves includes failing to receive diagnostic messages from the active exhaust valve.

12. The controller of claim 9, wherein detecting the malfunction of one of the plurality of active exhaust valves includes receiving a diagnostic message indicating a failure of the active exhaust valve.

13. The controller of claim 9, wherein the processor is configured to, when the ignition state transitions from on to off, set the plurality of active exhaust valves to fully open positions.

14. A method, comprising:
upon determining that a plurality of active exhaust valves in a vehicle were operating normally when an ignition state of the vehicle transitioned from a first on state to a first off state and that all of the plurality of active exhaust valves have malfunctioned when the ignition state transitions from the first off state to a second on state, enabling normal operation of an engine of the vehicle.

15. The method of claim 14, including:
upon determining that all of the plurality of active exhaust valves were not operating normally when the ignition state transitioned from a first on state to a first off state and that all of the plurality of active exhaust valves have malfunctioned when the ignition state transitions from the first off state to a second on state, reducing a power output of an engine of the vehicle.

16. The method of claim 14, wherein determining that the plurality of active exhaust valves were operating normally includes receiving diagnostic messages from each of the plurality of active exhaust valves indicating that each of the plurality of active exhaust valves are operating normally.

17. The method of claim 14, wherein determining that one of the plurality of active exhaust valves has malfunctioned includes failing to receive diagnostic messages from the active exhaust valve.

18. The method of claim 14, wherein determining that one of the plurality of active exhaust valves has malfunctioned includes receiving a diagnostic message indicating a failure of the active exhaust valve.

19. The method of claim 14, including delaying the determination that all of the plurality of active exhaust valves have malfunctioned by a failure time.

20. The method of claim 14, wherein determining that all of the plurality of active exhaust valves have malfunctioned when the ignition state transitions from the first off state to a second on state includes determining the none of the plurality of active exhaust valves has operated normally since the ignition state transitioned into the second on state.

21. The method of claim 14, further comprising controlling one or more performance parameters of the engine of the vehicle corresponding to an aftermarket exhaust that is not connected to the active exhaust valves.

* * * * *